United States Patent [19]

Shimizu et al.

[11] Patent Number: 4,872,124
[45] Date of Patent: Oct. 3, 1989

[54] LENGTH MEASURING DEVICE

[75] Inventors: Giichiro Shimizu; Toshiharu Okuyama; Yoshio Wakatsuki, all of Tokyo, Japan

[73] Assignee: Man Design Co., Ltd., Tokyo, Japan

[21] Appl. No.: 223,408

[22] Filed: Jul. 25, 1988

[30] Foreign Application Priority Data

Aug. 5, 1987 [JP] Japan ................................ 62-195854

[51] Int. Cl.[4] .................... G01B 7/02; G06F 11/16; G06F 11/22
[52] U.S. Cl. .................... 364/571.03; 364/571.07; 377/19; 377/25; 377/49; 324/207; 324/225; 307/491
[58] Field of Search ................ 377/2, 17, 19, 24, 25, 377/49; 307/310, 515, 491; 324/202, 207, 208, 224, 225; 364/571.03, 571.07

[56] References Cited

U.S. PATENT DOCUMENTS

| | | | |
|---|---|---|---|
| 4,331,920 | 5/1982 | Kalisch et al. | 324/225 |
| 4,458,322 | 7/1984 | Veale | 307/491 |
| 4,556,846 | 12/1985 | D'Hondt | 324/202 |
| 4,602,871 | 7/1986 | Hanaoka | 377/25 |
| 4,644,482 | 2/1987 | Juanarena | 364/571.03 |
| 4,796,212 | 1/1989 | Kitagawa | 364/571.03 |
| 4,817,022 | 3/1989 | Jornud et al. | 364/571.03 |

FOREIGN PATENT DOCUMENTS

3410292 2/1985 Fed. Rep. of Germany .
3340409 7/1985 Fed. Rep. of Germany .

*Primary Examiner*—John S. Heyman
*Attorney, Agent, or Firm*—Nixon & Vanderhye P.C.

[57] ABSTRACT

At the start of measurement by a length measuring device, a calibration coil in which the temperature characteristics are known, is connected to an oscillator. The oscillation frequency of the oscillator at this time is counted by a counter and is given to microcomputer. Microcomputer obtains temperature information corresponding to counted numbers with reference to a table of counted numbers versus temperature information which has already stored temperature information corresponding to a plurality of counted numbers and stores the obtained temperature information in a data storage area. In measurement mode, measured values subjected to temperature compensation are obtained according to the temperature information stored in the data storage area.

6 Claims, 4 Drawing Sheets

LENGTH MEASURING DEVICE

BACKGROUND OF THE INVENTION

1. Field of the Invention

This invention relates to a length measuring device capable of measurement with high accuracy and with reduced temperature deviations.

2. Description of the Related Art

As one of length measuring devices for precision measurement, the dial gauge is used widely in the machine industry. The main body of a dial gauge is secured at a fixed position with respect to a reference plane and the probe provided extending outward from the main body is applied to an object under measurement. The distance moved by the probe or the amount of retract of the probe is transmitted to the indicator of the main body to make the indicator needle to deflect. This type of length measuring device can make measurements of the order of 1/1000 mm. Dial gauges are used also for measurement of the diameter and roundness of the object under measurement.

Among the dial gauges, there are digitized types using a Colpitts oscillator that have appeared recently. To be more specific, the three-piece coil of a Colpitts oscillator is disposed along the moving area of a core attached the probe. In this case, the coil in the middle is for common use and is used to form a series circuit with either of the coils on both sides. In measurement, these series circuits are used as the reactance of a Colpitts oscillator and oscillation frequencies are obtained for two cases: one is that the center coil forms a series circuit with one of the coils on both sides and the other case is that the center coil forms a series circuit with the other coil.

The oscillation frequencies obtained with a Colpitts oscillator as described above are counted by a counter. The numbers counted are supplied to a microcomputer. The microcomputer calculates the displaced amount of the core, that is, the distance moved by the probe using the difference of the two counted numbers supplied, namely, the difference in frequency corresponding to a variation in reactance according to the position of the core. And the distance moved thus calculated is sent to a display unit for digital display.

This type of length measuring device operates on the principle that the variation in frequency is found by utilizing the variation in inductance according to the position of the core. Therefore, the reliability of measurement is influenced by the temperature characteristics of the coils, which can be said to be the heart of the length measuring device. The temperature characteristics can be investigated in advance. Hence, if the current temperature is known, the influence can be compensated. For this purpose, it is necessary to measure the temperature. For portable, compact length measuring device, a thermistor is generally adopted for temperature measurement after various conditions including convenience of mounting are taken into consideration.

Thermistors are expensive, which is a problem in adoption. In addition, for measuring temperature with a thermistor, special measuring circuit is required. Thus, the use of does not make for the reductions in size and cost of the length measuring device.

A well-known method of compensating the temperature characteristics of the coils is use of capacitors which have approximate but opposite temperature characteristics. Such capacitors are special types and consequently, expensive and hard to come by.

SUMMARY OF THE INVENTION

The present invention has been made in consideration of the above situation and has as its object to provide a length measuring device which does not require a special measuring circuit, is less expensive and is capable of accurate measurement and temperature compensation with high accuracy.

In order to achieve the above object, the length measuring device according to this invention comprises probe means provided extending in one direction and movably in the axial direction thereof, oscillating means having core means attached to the distal end of the probe means, first, second, and third coil means arranged in that order in the axial direction of the probe means and in the range of movement of the core means due to the movement of the probe means, and means for selectively connecting the second coil means in the middle in series with either of the first and third coil means, for generating and outputting signals of oscillation frequency according to the position of the core means in a first case where the second coil means is connected with the first coil means and in a second case where the second coil means is connected with the third coil means, counting means for counting the frequency in response to oscillation output signals given by the oscillating means, calibration coil means which is selectively connected to the oscillating means and whose temperature characteristics are known, temperature information generating and storing means for receiving numbers counted from the counting means when the calibration coil means is connected to the oscillating means, obtaining temperature information from the numbers counted, and storing the information, and arithmetic means for receiving numbers counted from the counting means, calculating a difference between the counted number of the first case and the counted number of the second case, temperature-compensating the calculated difference according to the temperature information stored in the temperature information generating and storing means, and finding the distance moved by the probe means from the temperature-compensated difference.

DETAILED DESCRIPTION OF THE PREFERRED EMBODIMENT

With reference to the accompanying drawings, description will now be made of a preferred embodiment of this invention.

Figure 1:
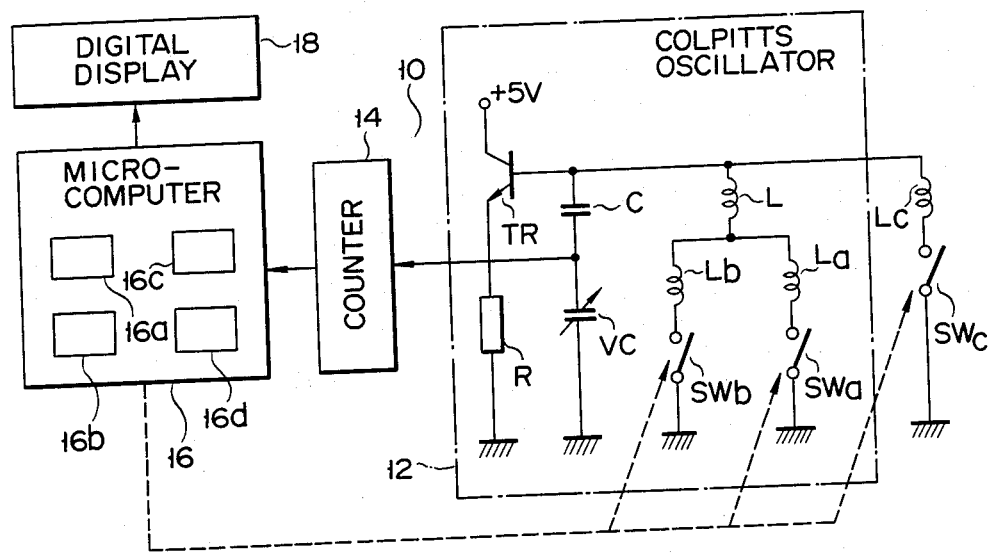
FIG. 1 is a view showing the circuit configuration according to a preferred embodiment of the invention.

FIG. 1 is a view showing the circuit configuration according to this invention. This length measuring device 10 comprises Colpitts oscillator 12, counter 14, microcomputer 16 constituting the arithmetic section, digital display 18, and coil $L_c$ for calibration. Colpitts oscillator 12 mentioned above has transistor TR. The collector of transistor TR is connected to an operation power supply "+5V", which is generated by a battery and a power circuit, and the emitter of transistor TR is connected across the resistance R to the ground potential. The base of transistor TR is connected across capacitor C and variable capacitor VC to the ground potential. The base of transistor TR is also connected across coils L and $l_a$ and switch $SW_a$ to the ground potential and at the same time, connected across coils L and $L_b$ and switch $SW_b$ to the ground potential. Oscillation output of oscillator 12 is taken out from the junction between capacitor C and variable capacitor VC. Coils $L_a$ and $L_b$ have the same value of impedance.

Figure 2:
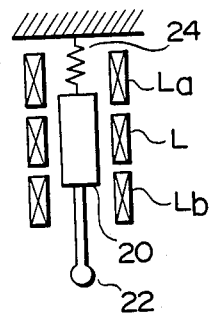
FIG. 2 is a view showing the positional relation of coils and a core member.

As for the positional relation among coils L, $L_a$, and $L_b$ of the oscillator 12, coils $L_a$ and $L_b$ are arranged across the coil L as is shown in FIG. 2. Core 20 attached to probe 22 is inserted at the center of coils $L_a$, L, and $L_b$. To be more concrete, long core 20 is coupled to probe 22 in a straight line with their axes matched. The extreme end of core 20 is pushed by compression spring 24, making probe 22 extend outside a length measuring device proper not shown. In other words, probe 22 including core 20 is supported freely movably in the axial direction. Coils $L_a$, L, and $L_b$ are arranged along the range of movement of core 20 due to the movement of probe 22 in contact with an object under measurement. Located in the middle is coil L, on the opposite sides of which are coils $L_a$ and $L_b$. Core 20 can move through coils $L_a$, L, and $L_b$.

Figure 3:
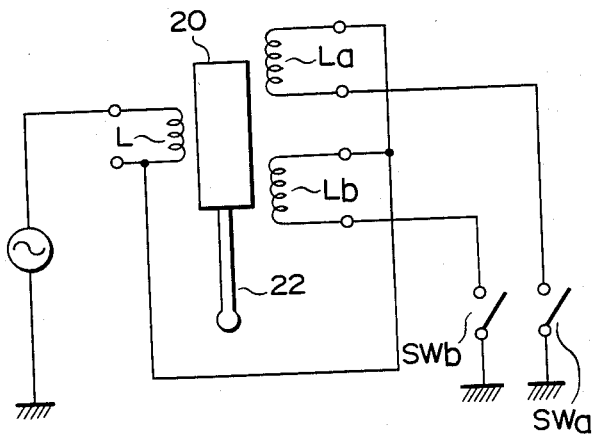
FIG. 3 is a view showing the circuit configuration of the coils.

The circuit configuration of these coils can be expressed as is shown in FIG. 3. Coil $L_a$ can form a series circuit with the common coil L by closing switch $SW_a$ in series with the coil $L_a$. Likewise, coil $L_b$ can form a series circuit with the common coil L by closing $SW_b$ in series with coil $L_b$. Therefore, when switching is done between the two series circuits by changing the combination of the common coil and coils $L_a$ and $L_b$ by alternately turning on switches $SW_a$ and $SW_b$, the inductances of the respective series circuits change according to the position of core 20, thus affecting the oscillation frequency of Colpitts oscillator 20.

By utilizing this, the oscillation frequency output of Colpitts oscillator 12 is counted by counter 14 for each of the two series circuits formed by different combinations of the common coil L and coils $L_a$ and $L_b$. The counted frequencies are input in microcomputer 16 constituting the arithmetic section. This microcomputer 16 has a memory (not shown) storing an operation program and a table 16a of counted numbers versus distances moved. To be more specific, microcomputer 16 calculates the difference of the counted oscillation frequencies by the two series circuits, and obtains a distance moved l corresponding to the difference of the counted numbers, by referring to table 16a of counted numbers versus displaced amounts. The distance moved l thus obtained is supplied from microcomputer 16 to digital display 18 to indicate the distance moved digitally.

The length measuring device according to this invention, which is composed as described above, has coil $L_c$ for calibration for use in calibration mode. A series circuit having calibration coil $L_c$ and switch $SW_c$ is connected in parallel with a circuit including coils $L_a$, L, and $L_b$ of Colpitts oscillator 12 mentioned above. This calibration coil $L_c$, the temperature characteristics of which are known, is connected to oscillator 12 when switch $SW_c$ is closed in calibration mode.

In the length measuring device according to this invention, a memory, not shown, of microcomputer 16 stores table 16b of temperature compensation information for use in compensating the counted number of oscillation frequency of oscillator 12 when the series circuit with coils L and $L_a$ and the circuit with coils L and $L_b$ are used, that is, in measurement mode and also stores table 16c of counted numbers versus temperature information for use in obtaining temperature information from the counted numbers of oscillation frequency of oscillator 12. The above-mentioned memory has data storage area 16d to store various kinds of data during operation such as temperature information.

Microcomputer 16 is provided with a selective closing control function for switches $SW_a$, $SW_b$, and $SW_c$. For example, when the power supply is put to work, first the calibration mode is set and temperature measurement is executed with switch $SW_c$ only closed. Then, the measurement mode is set. The frequency is counted with switch $SW_a$ only closed and then the frequency is counted with switch $SW_b$ only closed. From these counted frequencies, the distance moved by the probe is calculated. Since a self-contained battery is used for the power supply of the length measuring device, the length measuring device is constructed such that the circuit normally starts to operate when probe 22 retracts to a specified position. Therefore, an operation sequence can be formed such that when the power supply is turned on, the calibration mode is first set and then the measurement mode comes into effect.

Figure 4A:
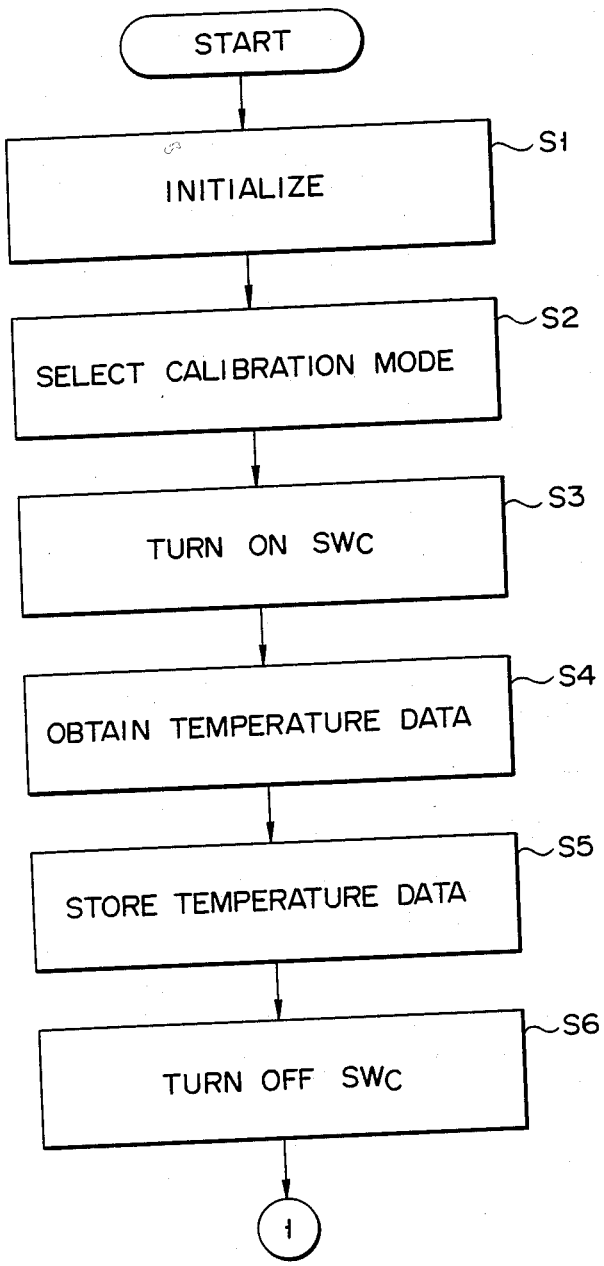
FIGS. 4A to 4C are a series of flowcharts to explain the processing operations of a microcomputer.
Figure 4B:
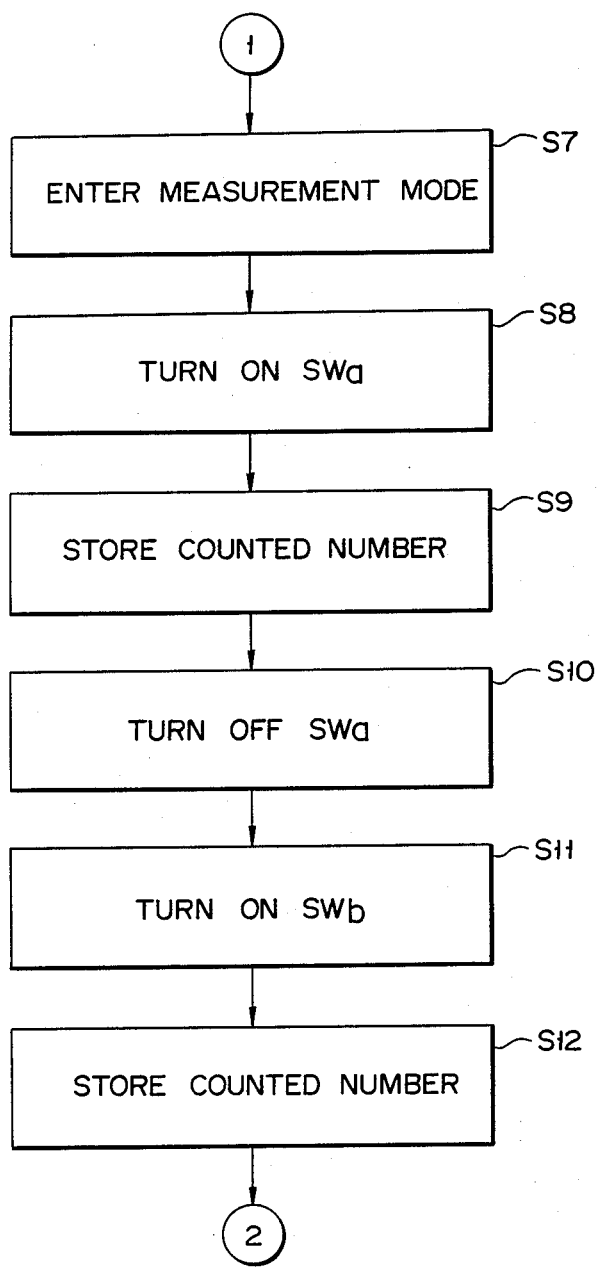
Figure 4C:
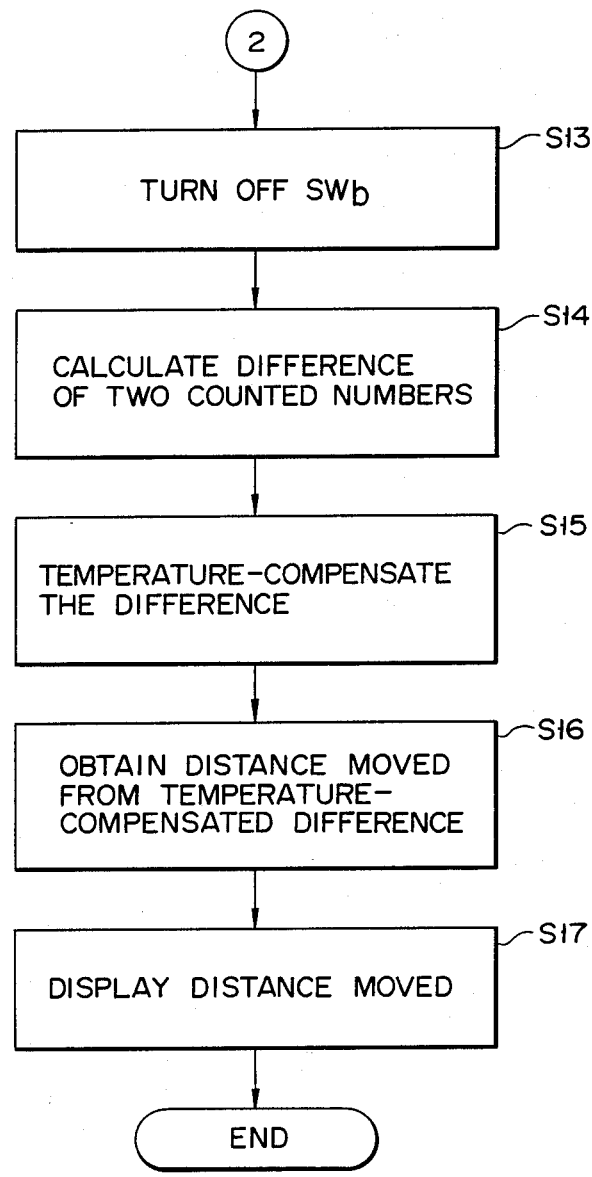

With reference to the flowcharts of FIGS. 4A to 4C, description will now be made of the operations of the length measuring device constructed as described above. This length measuring device is arranged at a fixed position with respect to the reference plane or reference position. An object under measurement is located at the reference plane or reference position and probe 22 is applied to the object. Probe 22 retracts by the amount of contact with the object. When probe 22 retracts to the specified position, the power supply is turned on to put microcomputer 16 constituting the arithmetic section into operation. Microcomputer 16 is initialized (Step S1) and selects the calibration mode (Step S2). Microcomputer 16 connects only coil $L_c$ for calibration, the temperature characteristics of which are known, to transistor TR of oscillator 12 by closing switch $SW_c$ only (Step S3). Oscillator 12 oscillates with calibration coil $L_c$ as the inductance and the oscillation output is counted by counter 14 and input into microcomputer 16.

Microcomputer 16 obtains temperature information from the counted number input with reference to table 16c of counted numbers versus temperature information (Step S4). When temperature information can be obtained, the information is stored in the above-mentioned data storage area 16d of memory (Step S5). Then, switch $SW_c$ is opened, thereby cutting off the connection of $L_c$ to transistor TR of oscillator 12 (Step S6). Then, microcomputer 16 enters the measurement mode (Step S7). That is to say, microcomputer 16 closes switch $SW_a$ only, thus connecting the series circuit with coils L and $L_a$ to transistor TR of oscillator 12 (Step S8). Therefore, oscillator 12 oscillates with these coils L and $L_a$ as inductances. The oscillation output is counted by counter 14 and input into microcomputer 16, which stores the counted number input in data storage area 16d of memory (Step S9). Then, switch $SW_a$ is opened to cut off the connection of the series circuit with coils L and $L_a$ to transistor TR of oscillator 12 (Step S10).

Then, microcomputer 16 closes switch $SW_b$ only to connect the series circuit with coils L and $L_b$ to transistor TR of oscillator 12 (Step S11). As a result, oscillator 12 oscillates with these coils L and $L_b$ as inductances. The oscillation output is counted by counter 14 and is input into microcomputer 16. Microcomputer 16 stores the counted number input in data storage area $16d$ of memory (Step S12). And, switch $SW_b$ is opened, thereby cutting off the connection of the series circuit with coils L and $L_b$ to transistor TR (Step S13).

When probe 22 is applied to the object under measurement, probe 22 retracts by the amount of contact with the object and core 20 attached to probe 22 also moves by the same amount. As a result, core 20 slides relative to coils $L_a$, L, and $L_b$ disposed in the movable range of core 20. The inductances of coils $L_a$, L, and $L_b$ change accordingly. Hence, the series circuits with different coils are used as inductances of oscillator 12 by alternately selecting the series circuits by selectively tuning on switches $SW_a$ and $SW_b$. In consequence, the output frequency of oscillator 12 is changed by switching over one switch to another. Oscillation frequency signals reflecting the position of core 20 are output when switches $SW_a$ and $SW_b$ are closed, respectively.

The frequencies are counted by counter 14 and microcomputer 16 obtains the difference of the counted numbers for the two series circuits with the coils mentioned above. In short, the respective counted numbers stored in data storage area $16d$ are read out and a difference between the counted numbers is calculated (Step S14). Next, temperature compensation is added to the difference of the counted numbers based on the temperature information stored in data storage area $16d$ of memory and with reference to temperature compensation information table $16b$ of the memory (Step S15). The distance moved l by the probe is obtained which corresponds to the difference of the temperature-compensated counted numbers with reference to table $16a$ of counted numbers versus distances moved in the memory (Step S16). The distance moved l thus calculated is supplied to digital display 18 and displayed there (Step S17).

The length measuring device according to this invention has a calibration coil, the temperature characteristics are known and which has high stability. In the calibration mode, this calibration coil is used to oscillate the oscillator and from the oscillation frequency, the current temperature is obtained. In the subsequent measurement process, the temperature thus obtained is used for temperature compensation. Thus, accurate temperature information can be obtained only by using the oscillator as it is and without adding any other special circuit only for temperature measurement. Use of the calibration coil, which is cheaper than the thermistor and which obviates the need to use a special circuit for temperature measurement, will contribute to cost savings and reduction in size of length measuring devices.

This invention is not limited by the preferred embodiment as shown in the accompanying drawings and changes and modifications may be made without departing from the spirit and scope of the invention. For example, in the above embodiment, the power is supplied when the probe retracts to the specified position. However, a power supply switch may be provided separately. In addition, in the above embodiment, temperature compensation is added to the difference of the counted numbers. In contrast to this, it is possible to store temperature-compensated counted numbers in the data storage area or apply temperature compensation to the distance moved which has been obtained from the counted numbers.

What is claimed is:

1. A length measuring device comprising:
   probe means provided extending in one direction and movably in the axial direction thereof;
   oscillating means having core means attached to the distal end of said probe means, first second, and third coil means arranged in that order in the axial direction of said probe means and in the range of movement of said core means due to the movement of said probe means, and means for selectively connecting said second coil means in the middle in series with either of said first and third coil means, for generating and outputting signals of oscillation frequency according to the position of said core means in a first case where said second coil means is connected with said first coil means and in a second case where said second coil means is connected with said third coil means;
   counting means for counting the oscillation frequency in response to oscillation output signals given by said oscillating means;
   calibration coil means which is selectively connected to said oscillating means and whose temperature characteristics are known;
   temperature information generating and storing means for receiving numbers counted from said counting means when said calibration coil means is connected to said oscillating means, obtaining temperature information from the numbers counted, and storing the information; and
   arithmetic means for receiving counted numbers from said counting means, calculating a difference between the counted number of the first case and the counted number of the second case, temperature-compensating the calculated difference according to the temperature information stored in said temperature information generating and storing means, and finding the distance moved by said probe means from the temperature compensated difference.

2. The length measuring device according to claim 1, further comprising means for connecting said calibration coil means to said oscillating means at the start of measurement by said length measuring device.

3. The length measuring device according to claim 1, wherein said temperature information generating and storing means includes a table of counted numbers versus temperature information which has previously stored a plurality of counted numbers and temperature information corresponding to the counted numbers and temperature information storing means for storing temperature information, obtains temperature information corresponding to the counted numbers from said counting means with reference to said table of counted numbers versus temperature information, and stores the obtained temperature information in said temperature information storing means.

4. The length measuring device according to claim 3, wherein said arithmetic means includes a temperature compensation information table which has previously stored temperature compensation information corresponding to a plurality of temperature information, obtains temperature compensation information corresponding to the temperature information stored in said temperature storing means with reference to said temperature compensation information table, and temperature-compensates the calculated difference according to the temperature compensation information.

5. The length measuring device according to claim 3, wherein said arithmetic means includes a table of difference values versus distances moved, which has previously stored distances moved corresponding to a plurality of differences, and obtains a distance moved corresponding to the temperature-compensated difference with reference to said table of difference values versus distances moved.

6. The length measuring device according to claim 3, further comprising means for displaying the distance moved by said probe means obtained by said arithmetic means.

* * * * *